Figure 1:
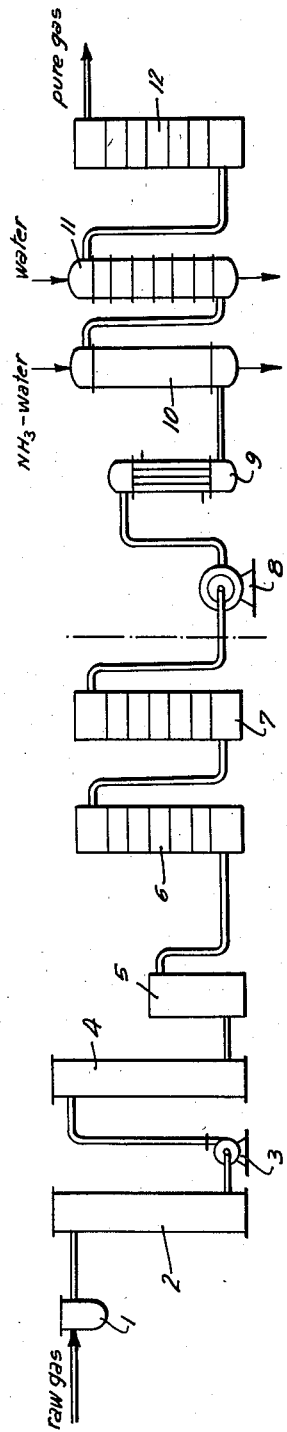

June 3, 1958

O. GROSSKINSKY ET AL 2,837,398

PROCESS OF REMOVING HYDROCYANIC ACID, HYDROGEN
SULFIDE AND AMMONIA FROM GASES

Filed Aug. 7, 1953

2 Sheets—Sheet 1

INVENTORS
BY
ATTORNEY

June 3, 1958 O. GROSSKINSKY ET AL 2,837,398
PROCESS OF REMOVING HYDROCYANIC ACID, HYDROGEN
SULFIDE AND AMMONIA FROM GASES
Filed Aug. 7, 1953 2 Sheets-Sheet 2

INVENTORS
BY
ATTORNEY

United States Patent Office 2,837,398
Patented June 3, 1958

2,837,398

PROCESS OF REMOVING HYDROCYANIC ACID, HYDROGEN SULFIDE AND AMMONIA FROM GASES

Otto Grosskinsky, Heinrich Fruhbuss, and Walter Klempt, Dortmund-Eving, Germany

Application August 7, 1953, Serial No. 372,853

Claims priority, application Germany August 8, 1952

6 Claims. (Cl. 23—3)

The present invention relates to a process of removing hydrocyanic acid, hydrogen sulfide and ammonia from coal distillation gases such as coke oven gas.

The removal of hydrogen sulfide from coal distillation gases such as coke oven gases is generally carried out by a liquid purification whenever large amounts of crude gas are to be purified. The dry purification of gases for the removal of hydrogen sulfide and other impurities therefrom is generally used at present only in small gas works.

In practice, the wet desulfurization of the crude gas was generally carried out without consideration for the hydrocyanic acid and, therefore, the hydrocyanic acid was washed out of the gas together with the hydrogen sulfide. The scrubbed hydrocyanic acid, however, becomes detrimental to the washing process as it becomes enriched in the form of salts in the washing liquor. When washing with ammonia water, i. e. ammonium thiocyanate is formed; when, on the other hand, scrubbing with potassium-carbonate solution, potassium thiocyanate is formed. In the course of time these solutions become useless and must be renewed since the salts corrode the equipments used for the regeneration of the washing liquors.

It is therefore an object of the present invention to provide a new and economical process for the removal of hydrocyanic acid, hydrogen sulfide and ammonia from coal distillation gases.

It is another object of the present invention to provide a new method of utilizing the purifying masses resulting from the final desulfurization of coal distillation gases.

It is still a further object of the present invention to provide a process of purifying coal distillation gases whereby during the removal of the hydrogen sulfide and ammonia from the gases the equipment will be less corroded because of prior removal of the hydrocyanic acid from the gases.

It is still another object of the present invention to provide a method of combining the liquid purification method of removing hydrogen sulfide and ammonia from coal distillation gases with a dry purification method of removing HCN which results in more economical purification of the gases.

Additional objects and advantages of the present invention will be apparent from a further reading of the specification and of the appended claims.

The present invention is based upon the prior removal of the hydrocyanic acid from a gas containing the same and also containing hydrogen sulfide and ammonia by means of a dry purification method which allows for the removal of the hydrocyanic acid from the gas in an efficient and economical manner especially, when purifying large amounts of gas. This removal of the hydrocyanic acid from the gas by means of a dry purification is then followed by the normal liquid purification or wet scrubbing of the remaining gas to remove the hydrogen sulfide and the ammonia therefrom in a liquid manner. This process allows for the subsequent liquid purification of the gas for the removal of hydrogen sulfide and amomnia therefrom to proceed without disturbance.

The process of the present invention thus mainly comprises a process of purifying coke oven gas, comprising the steps of passing a cooled, detarred coke oven gas containing hydrocyanic acid, hydrogen sulfide and amomnia through a dry purification mass adapted to absorb substantially only the hydrocyanic acid from the coke oven gas, thereby forming a coke oven gas substantially free of hydrocyanic acid, and scrubbing the thus obtained coke oven gas to wash out the hydrogen sulfide and the ammonia therefrom by liquid purification, thereby obtaining a pure coke oven gas.

The process of the present invention provides additional advantages according to preferred embodiments of the present invention when the subsequent liquid washing-out of the hydrogen sulfide is carried out at elevated pressure. In this case the advantage of first effecting a dry purification for the removal of the hydrocyanic acid from the crude gas and besides of last tar constituents is that it allows for the later compression of the crude gas with the subsequent advantages in desulfurization under pressure resulting therefrom without disturbances which would result from the presence of hydrocyanic acid and small amounts of tar constituents. Further advantages are obtained if the hydrogen sulfide liquid purification is followed by an additional dry purification. In this case it is possible to utilize the spent purification mass resulting from the final desulfurization for the removal of the hydrocyanic acid from fresh coal distillation gases containing the same and thereby better use is made of the spent purification mass.

The proceeding according to the process of the present invention is rather simple as may be seen from the following summary thereof: The hot crude gas coming from the receiver is cooled and freed from tar and water (as far as it condenses). The tar may be removed from the crude gas in any suitable manner, for example electrostatically or mechanically. The gas is then subjected to a dry purification by being passed over a dry purification mass and the hydrocyanic acid is quantitatively removed from the gas. The hydrocyanic acid is completely absorbed during the dry purification whereas little or no hydrogen sulfide is absorbed. After leaving the dry purification, the gas is subjected to a liquid purification by scrubbing and according to a preferred embodiment of the present invention this may be carried out under superatmospheric pressure to remove the hydrogen sulfide and ammonia from the gas.

With respect to the liquid purification, it does not matter whether the ammonia is first washed out or the hydrogen sulfide is first washed out, and it also does not matter what type of chemical solutions are used for this purpose, any solutions normally used for this purpose being suitable for the present invention. The advantageous results of the present invention are always achieved provided that the hydrocyanic acid is removed by passing the same over a dry purification mass adapted to remove the hydrocyanic acid before washing out of the hydrogen sulfide and ammonia from the gas.

The dry purification of the coke oven gas for the removal of the hydrocyanic acid therefrom is preferably carried out utilizing bivalent iron compounds such as ferrosulfate. If the purification mass is still fresh then a relatively large amount of hydrogen sulfide is bound by the purification mass during the removal of the hydrocyanic acid until the mass is preponderantly in the form of iron sulfide. At such time the mass no longer takes up any hydrogen sulfide but instead only absorbs hydrocyanic acid forming complex cyanogen compounds. Simultaneously with the formation of the complex cyanogen compounds, the hydrogen sulfide previously taken up by the dry purification mass is to a small extent again given off.

The well known gas purification masses may be utilized as the dry purification mass for the removal of the hydrocyanic acid from the crude gas. It is possible to use for example bog iron ore, or Lux-mass which is the residue from bauxite treatment, the latter being most suitable for the process of the present invention because of its alkali content which favors the rate of reaction. The purification masses may be fine grains, coarse grained or in the form of larger pieces.

As stated, the purification mass is preferably of a bivalent iron compound. It is also possible to utilize a mixture of bivalent and trivalent iron compounds, the trivalent iron during the process being reduced to bivalent iron, this being favored by the presence of ammonia in the gas.

The removal of the hydrocyanic acid from the gas is best accomplished with ferrous sulfide which has a high ability for removal of the hydrocyanic acid and which reacts with hydrocyanic acid in the presence of ammonia according to the following equation:

$$FeS + 4NH_3 + 6H(CN) = (NH_4)_4Fe(CN)_6 + H_2S$$

In addition, insoluble ferrocyanides such as Prussian blue are formed.

During the process, iron salts other than ferrous sulfide are generally first converted to ferrous sulfide and the ferrous sulfide then acts to remove the hydrocyanic acid from the coal distillation gas. For example ferric hydroxide is reduced and sulfided according to the following equation:

$$2Fe(OH)_3 + 3H_2S = 2FeS + S + 6H_2O$$

This reaction is favored by the influence of ammonia which is present in the cooled coal distillation gases in about 60% of the original ammonia content and in general in an amount of about 2–8 g. ammonia per cubic meter of gas. The ferrous sulfide as previously mentioned reacts with the hydrocyanic acid, and depending upon the alkali content, forms partly soluble and partly insoluble cyanogen compounds, whereby the hydrogen sulfide is released. The precipitated sulfur reacts with the hydrocyanic acid and ammonia to form ammonium thiocyanate according to the following equation:

$$S + NH_3 + HCN = NH_4CNS$$

When using from the very beginning a material containing bivalent iron only, only little sulfur will be precipitated and corresponding to this only little ammonium thiocyanate will be formed. In every case, the absorbing power of the mass owing to the ammonia present is excellent and the water content of the crude gas avoids a drying up of the mass. In the case that, exceptionally, the ammonia content of the gas should be below 1 g. per cubic meter, it is possible to irrigate the mass with ammonia water at the same time, effectuating thereby the same reaction.

At the start of the process, it is possible to operate with fresh material. In this case the hydrocyanic acid first passes through the purifier. Therefore, it is convenient to mount two purifiers in series in such a manner that the purifier filled with fresh material will have gas free from hydrocyanic acid but containing hydrogen sulfide passed therethrough. The purifying mass will therein be sulfided. When the first purifier is no longer able to absorb hydrocyanic acid, the second purifier is then ready to completely absorb the hydrogen cyanide so that there is sufficient time to dismount the first purifier, to charge it anew and then to mount it as second purifier. But it is possible also to operate only with one purifier if a short-term penetration of hydrocyanic acid is tolerated.

The crude gas containing ammonia can also be freed from hydrocyanic acid by means of a mass which has been partly charged with sulfur. To this category belong also the so-called final cleanup masses, i. e. masses remaining from the final cleanup stage. As is known, the gas freed from hydrogen sulfide by means of liquid purification is often carried once more through a dry purification apparatus to eliminate remaining amounts of hydrogen sulfide. The dry purification mass is thus enriched to about 30% of sulfur without it being necessary generally to additional oxygen to the gas. In many countries such a material is wasted. The invention therefore now offers a way of removing hydrocyanic acid from the gas using this spent purifying mass and at the same time making the mass resulting from the final purification stage more saleable. It is thus possible to enrich the mass according to its character up to 5–10% and more of hydrocyanic acid, mainly as $NH_4SCN$. In practice it is necessary only to mount the oxide boxes of the final cleanup, i. e. the final dry purifier, when no longer absorbing sulfur in a sufficient amount, into the gas equipment so that the gas cooled and freed from the main tar constituents can flow through these boxes.

The degree of enrichment with hydrocyanic acid and its compounds, respectively, is to a great extent a question of the condition of the purifying material. In the first place it must be so adjusted that it is passed over by the gas in a uniform manner. These conditions are accomplished by using i. e. Lux-material of a grain size of 1–2 mm. Furthermore, the water content has to be about 40% and should preferably be maintained at this content. Variations, however, are possible depending upon the reactivity of the material. Any of the usual materials which are sold may be utilized for the purification mass, most of the materials containing trivalent iron oxide, water, and a little alkali. They are either natural such as bog iron ore or produced synthetically such as the previously mentioned Lux-purifying material, the by-product resulting when producing aluminum from bauxite.

The liquid purification of the hydrocyanic acid-free gas for the removal of hydrogen sulfide and ammonia therefrom may be carried out in any common manner, and preferably under superatmospheric pressure; for example the gas is passed through a hydrogen sulfide scrubber which may be equipped with baffles, plates, Raschig rings, etc. It is possible to scrub the gas for example with ammonia water to remove the hydrogen sulfide and then to distill off the ammonia. It is also possible to first remove the ammonia and then to remove the hydrogen sulfide. In either case, the entire purification process is facilitated by the prior removal of the hydrogen cyanide by passing the same over a dry purification mass.

The following examples are given as illustrative of the present invention, the scope of said invention however not being limited to these specific examples.

*Example I*

200,000 cubic meters of coke oven gas containing 7 g. hydrogen sulfide, 0.8 g. hydrocyanic acid and 8 g. ammonia per cubic meter are cooled, detarred and caused to flow during 24 hours through an oxide box charged with 12 cubic meters of fresh Lux-mass. After 24 hours this mass is completely sulfided and it no longer absorbs hydrogen sulfide. The hydrocyanic acid is then quantitatively absorbed by the mass. The thus obtained gas is then subjected to a liquid purification in the usual manner for the removal of hydrogen sulfide and ammonia. After about 24 days of such treatment it is necessary to renew the purification mass.

*Example II*

1,700,000 cubic meters of gas after being freed from hydrocyanic acid by being passed through a dry purification mass are freed at elevated pressure from hydrogen sulfide, ammonia and benzene. The gas is then passed through five dry purification towers in which the hydrogen sulfide still remaining in the gas (about 2 g. per cubic meter) is removed.

The dry purifiers of 3 m. in diameter and 15 m. in height will be subsequently passed through by the gas whereby the tower filled with fresh purification mass is mounted at the end. About every two and a half months the first tower, mainly enriched with sulfur (about 30%) will be replaced and according to requirement mounted in the gas passage behind the final cooler where this tower now will be passed through by the gas which has only been cooled and freed from the main tar constituents to remove hydrocyanic acid from the gas.

This proceeding lasts in general about 2 to 4 months; then another purifier, enriched to about 30% sulfur will be changed over to remove hydrocyanic acid. The gas leaving the hydrocyanic acid purifier may be compressed without difficulties by piston compressors. The main parts of the hydrogen sulfide, ammonia and benzene are removed from the gas under elevated pressure in the usual manner by liquid purification means.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

The drawings diagrammatically illustrate the gas purification according to the present invention. Figures 2, 3, 4, 5 and 6 illustrate variations in the liquid purification for the removal of hydrogen-sulfide and ammonia from the gas which has had the hydrocyanic acid removed therefrom by the dry purification according to the present invention.

Referring more particularly to the drawings, the hot raw gas enters receiver 1 from which it is passed to the cooler 2, through the gas exhauster 3 and to the final cooler 4. The cooled gas is then passed through the electrical detarring apparatus 5 wherein it is substantially completely detarred. The detarred and cooled gas is passed through the dry purifiers 6 and 7 which are charged with Lux-mass. In purifier 6 the hydrocyanic acid is bound. In purifier 7 the iron compounds are sulfided by the hydrogen sulfide gas and ferrous sulfide is formed. As soon as purifier 6 allows the hydrocyanic acid to pass through without binding all of the hydrocyanic acid, it is filled with fresh dry purification masses and inserted behind the purifier 7. Thus, the purifier 7 which now contains ferrous sulfide removes the hydrocyanic acid from the gas and the freshly charged purifier 6 is sulfided by the hydrocyanic acid-free gas. This process is carried on continuously.

The gas freed from hydrocyanic acid and from some hydrogen-sulfide which has sulfided the dry purification mass in purifier 7 is compressed in compressor 8, cooled again in cooler 9 and then frees from hydrogen sulfide and ammonia in scrubbers 10 and 11. Finally, the gas passes if necessary once more through a dry purifier 12 in which any remaining hydrogen sulfide is absorbed.

Generally, several final purifiers are utilized. When a final purifier is no longer able to absorb hydrogen sulfide it may be inserted as required in the place of purifier 6 wherein it may bind hydrocyanic acid.

Figure 2:
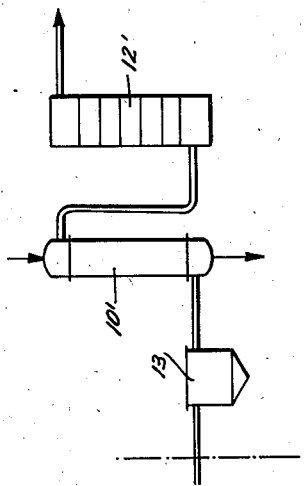

In Figure 2 is illustrated the absorption of ammonia by means of sulfuric acid in a saturator 13 from which the gas is then passed through scrubber 10' and an additional dry purifier 12'.

Figure 3:
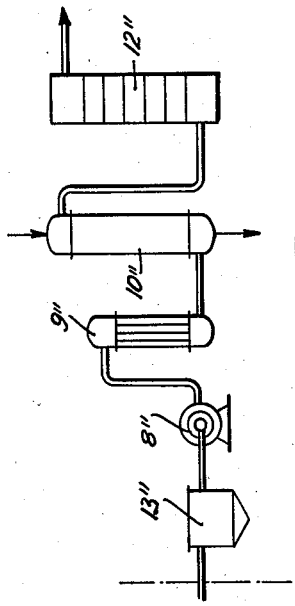

In Figure 3 the hydrocyanic acid-free gas is passed through a saturator 13" wherein the ammonia is removed. The gas is then passed through compressor 8" then through cooler 9", and then freed of hydrogen sulfide in scrubber 10". The gas is then passed through dry purifier 12" wherein remaining traces of hydrogen sulfide are removed.

Figure 4:
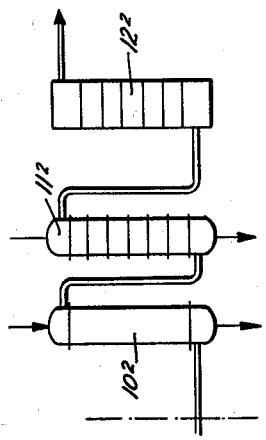

Figure 4 illustrates the removal of ammonia and hydrogen sulfide under normal pressure from the gas which has been freed of hydrocyanic acid by the dry purification. According to this variation the gas is passed directly from purifier 7 to scrubber $10^2$ and through scrubber $11^2$. The gas is then passed through a final dry purifier $12^2$.

Figure 5:
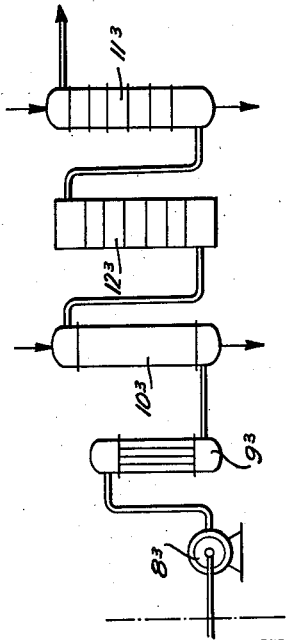

Figure 5 illustrates operation under super-atmospheric pressure wherein the final dry purification for the removal of hydrogen sulfide is carried out before the ammonia washing. According to this variation the gas leaving the purifier 7 is compressed in compressor $8^3$, cooled in cooler $9^3$, scrubbed for the removal of hydrogen sulfide in scrubber $10^3$, passed through the final hydrogen sulfide purifier $12^3$ and then subjected to a liquid purification for the removal of ammonia in scrubber $11^3$.

Figure 6:
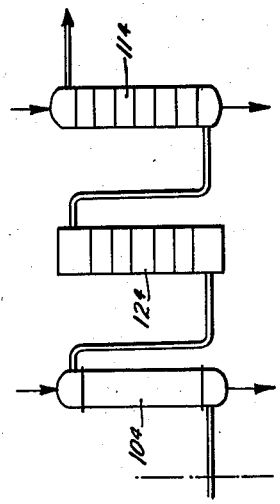

In Figure 6 is illustrated the operation of Figure 5 wherein the final hydrogen sulfide purification is carried out before the ammonia scrubbing, all under normal pressure. The gas from purifier 7 is passed through scrubber $10^4$ and final dry purifier $12^4$ before it is passed through the scrubber $11^4$ for the removal of ammonia.

It is always possible to substitute a saturator charged with sulfuric acid in place of the scrubbers 11, $11^2$, $11^3$ and $11^4$ for the removal of ammonia.

Many methods of washing out the bulk of the hydrogen sulfide, for example by means of scrubber 10 are possible, i. e. by a solution of potash, by a solution of ammonium arseniate (Thylox process) or by a solution of sodium carbonate (Seabord process). These processes all follow the absorption of the ammonia (Figures 2 and 3). The potash process is usually carried out under pressure.

The final dry purification by means of purifier 12 is not always necessary. If it is necessary, it may follow the hydrogen sulfide washing (Figures 5 and 6) or the ammonia absorption (Figures 1 and 4).

While the invention has been illustrated and described as embodied in process of removing hydrocyanic acid, hydrogen sulfide and ammonia from coal distillation gases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; passing the thus hydrogen cyanide-free gas still containing hydrogen sulfide and ammonia in a second stage through a purification mass consisting essentially of iron oxide, whereby hydrogen sulfide is absorbed and converts said iron oxide to ferrous sulfide which is adapted to absorb hydrogen cyanide; substituting the purification mass of said first stage when the same has become substantially saturated with hydrogen cyanide with the purification mass of said second stage which now consists essentially of ferrous sulfide which is adapted to absorb hydrogen cyanide and replacing said purification mass of said second stage with a fresh iron oxide purification mass which is adapted to absorb hydrogen sulfide; passing the coke oven gas obtained from said second purification stage still containing ammonia and a reduced amount of hydrogen sulfide and being substantially free of hydrogen cyanide in a third stage through liquid purifiers adapted to remove substantially all of said ammonia and a major portion of the remaining hydrogen sulfide from said gas by liquid scrubbing thereof; and passing the thus obtained coke oven gas still containing some hydrogen sulfide and being substantially free of ammonia and hydrogen cyanide in a last stage through a purification mass consisting essentially of iron oxide which absorbs the remainder of said hydrogen sulfide from said coke oven gas, thereby obtaining a purified coke oven gas being substantially free of hydrogen cyanide, hydrogen sulfide and ammonia.

2. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; passing the thus hydrogen cyanide-free gas still containing hydrogen sulfide and ammonia in a second stage through a purification mass consisting essentially of iron oxide, whereby hydrogen sulfide is absorbed and converts said iron oxide to ferrous sulfide which is adapted to absorb hydrogen cyanide; substituting the purification mass of said first stage when the same has become substantially saturated with hydrogen cyanide with the purification mass of said second stage which now consists essentially of ferrous sulfide which is adapted to absorb hydrogen cyanide and replacing said purification mass of said second stage with a fresh iron oxide purification mass which is adapted to absorb hydrogen sulfide; compressing and cooling the coke oven gas obtained from said second purification stage still containing ammonia and a reduced amount of hydrogen sulfide and being substantially free of hydrogen cyanide; and passing the thus compressed and cooled coke oven gas in a third stage through liquid purifiers adapted to remove substantially all of said ammonia and a major portion of the remaining hydrogen sulfide from said gas by liquid scrubbing thereof; and passing the thus obtained coke oven gas still containing some hydrogen sulfide and being substantially free of ammonia and hydrogen cyanide in a last stage through a purification mass consisting essentially of iron oxide which absorbs the remainder of said hydrogen sulfide from said coke oven gas, thereby obtaining a purified coke oven gas being substantially free of hydrogen cyanide, hydrogen sulfide and ammonia.

3. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; passing the thus hydrogen cyanide-free gas still containing hydrogen sulfide and ammonia in a second stage through liquid purifiers adapted to remove substantially all of said ammonia and a major portion of said hydrogen sulfide from said gas by liquid scrubbing thereof; passing the thus obtained coke oven gas still containing some hydrogen sulfide and being substantially free of ammonia and hydrogen cyanide in a third stage through a purification mass consisting essentially of iron oxide which absorbs the remainder of said hydrogen sulfide from said coke oven gas, thereby obtaining a purified coke oven gas being substantially free of hydrogen cyanide, hydrogen sulfide and ammonia, said iron oxide being converted by said hydrogen sulfide to ferrous sulfide which is adapted to absorb hydrogen cyanide; and substituting the purification mass of said first stage when the same has become substantially saturated with hydrogen cyanide with the purification mass of said third stage which now consists essentially of ferrous sulfide which is adapted to absorb hydrogen cyanide and replacing said purification mass of said third stage with a fresh iron oxide purification mass which is adapted to absorb hydrogen sulfide.

4. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; compressing and cooling the thus hydrogen cyanide-free gas still containing hydrogen sulfide and ammonia; passing the thus compressed and cooled gas in a second stage through liquid purifiers adapted to remove substantially all of said ammonia and a major portion of said hydrogen sulfide from said gas by liquid scrubbing thereof; passing the thus obtained coke oven gas still containing some hydrogen sulfide and being substantially free of ammonia and hydrogen cyanide in a third stage through a purification mass consisting essentially of iron oxide which absorbs the remainder of said hydrogen sulfide from said coke oven gas, thereby obtaining a purified coke oven gas being substantially free of hydrogen cyanide, hydrogen sulfide and ammonia, said iron oxide being converted by said hydrogen sulfide to ferrous sulfide which is adapted to absorb hydrogen cyanide; and substituting the purification mass of said first stage when the same has become substantially saturated with hydrogen cyanide with the purification mass of said third stage which now consists essentially of ferrous sulfide which is adapted to absorb hydrogen cyanide and replacing said purification mass of said third stage with a fresh iron oxide purification mass which is adapted to absorb hydrogen sulfide.

5. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; passing the thus hydrogen cyanide-free gas still containing hydrogen sulfide and ammonia in a second stage through liquid purifiers adapted to remove a major portion of said hydrogen sulfide from said gas by liquid scrubbing thereof; passing the thus obtained coke oven gas still containing ammonia and some hydrogen sulfide and being substantially free of hydrogen cyanide in a third stage through a purification mass consisting essentially of iron oxide which absorbs the remainder of said hydrogen sulfide from said coke oven gas, said iron oxide being converted by said hydrogen sulfide to ferrous sulfide which is adapted to absorb hydrogen cyanide; substituting the purification mass of said first stage when the same has become substantially saturated with hydrogen cyanide with the purification mass of said third stage which now consists essentially of ferrous sulfide which is adapted to absorb hydrogen cyanide and replacing said purification mass of said third stage with a fresh iron oxide purification mass which is adapted to absorb hydrogen sulfide; and passing the thus obtained coke oven gas still containing ammonia and being substantially free of hydrogen cyanide and hydrogen sulfide in a last stage through liquid purifiers adapted to remove substantially all of said ammonia by liquid scrubbing thereof, thereby obtaining a purified coke oven gas being substantially free of hydrogen cyanide, hydrogen sulfide and ammonia.

6. A method of purifying coke oven gas containing hydrogen cyanide, hydrogen sulfide and ammonia as impurities, comprising the steps of passing a cooled, detarred coke oven gas containing substantially its original content of hydrogen cyanide, hydrogen sulfide and ammonia in a first stage through a purification mass consisting essentially of ferrous sulfide which absorbs the hydrogen cyanide from said gas; compressing and cooling the thus hydrogen cyanide-free gas still containing hydrogen sulfide and ammonia; passing the thus compressed and cooled gas in a second stage through liquid purifiers adapted to remove a major portion of said hydrogen sulfide from said gas by liquid scrubbing thereof; passing the thus obtained coke oven gas still containing ammonia and some hydrogen sulfide and being substantially free of hydrogen cyanide in a third stage through a purification mass consisting essentially of iron oxide which absorbs the remainder of said hydrogen sulfide from said coke oven gas, said iron oxide being converted by said hydrogen sulfide to ferrous sulfide which is adapted to absorb hydrogen cyanide; substituting the purification mass of said first stage when the same has become substantially saturated with hydrogen cyanide with the purification mass of said third stage which now consists essentially of ferrous sulfide which is adapted to absorb hydrogen cyanide and replacing said purification mass of said third stage with a fresh iron oxide purification mass which is adapted to absorb hydrogen sulfide; and passing the thus obtained coke oven gas still containing ammonia and being substantially free of hydrogen cyanide and hydrogen sulfide in a last stage through liquid purifiers adapted to remove substantially all of said ammonia by liquid scrubbing thereof, thereby obtaining a purified coke oven gas being substantially free of hydrogen cyanide, hydrogen sulfide and ammonia.

References Cited in the file of this patent

UNITED STATES PATENTS

| Number | Name | Date |
|---|---|---|
| 291,163 | Vigne | Jan. 1, 1884 |
| 625,964 | Bueb | May 10, 1899 |
| 832,466 | Feld | Oct. 2, 1906 |
| 1,806,370 | Sperr | May 19, 1931 |
| 1,971,779 | Gollmar | Aug. 28, 1934 |
| 2,007,741 | Broche | July 5, 1935 |
| 2,019,468 | Bacon | Oct. 29, 1935 |
| 2,106,734 | Gollmar | Feb. 1, 1938 |

FOREIGN PATENTS

| Number | Country | Date |
|---|---|---|
| 12,485 of 1899 | Great Britain | Nov. 25, 1899 |
| 670,028 | Great Britain | Apr. 9, 1952 |